United States Patent
Bukkems et al.

(10) Patent No.: US 11,947,154 B2
(45) Date of Patent: Apr. 2, 2024

(54) LUMINAIRE AND LIGHTING SYSTEM

(71) Applicant: SIGNIFY HOLDING B.V., Eindhoven (NL)

(72) Inventors: Peter Johannes Martinus Bukkems, Deurne (NL); Ludovicus Johannes Lambertus Haenen, Sint Oedenrode (NL); Johannes Petrus Maria Ansems, Hulsel (NL); Barry Mos, Bocholt (BE); Martinus Hermanus Wilhelmus Maria Van Delden, Venlo (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/923,596

(22) PCT Filed: May 6, 2021

(86) PCT No.: PCT/EP2021/062045
§ 371 (c)(1),
(2) Date: Nov. 6, 2022

(87) PCT Pub. No.: WO2021/228689
PCT Pub. Date: Nov. 18, 2021

(65) Prior Publication Data
US 2023/0236354 A1    Jul. 27, 2023

(30) Foreign Application Priority Data

May 14, 2020 (EP) ...................................... 20174719
May 26, 2020 (EP) ...................................... 20176584

(51) Int. Cl.
*G02B 6/00* (2006.01)
*F21V 8/00* (2006.01)

(52) U.S. Cl.
CPC ......... *G02B 6/0076* (2013.01); *G02B 6/0036* (2013.01); *G02B 6/0068* (2013.01); *G02B 6/0073* (2013.01)

(58) Field of Classification Search
CPC .. G02B 6/0076; G02B 6/0036; G02B 6/0068; G02B 6/0073
See application file for complete search history.

(56) References Cited

U.S. PATENT DOCUMENTS

| | | |
|---|---|---|
| 2004/0212757 A1 | 10/2004 | Lee et al. |
| 2010/0026703 A1 | 2/2010 | Parker et al. |

(Continued)

*Primary Examiner* — Gerald J Sufleta, II

(57) ABSTRACT

The invention relates to a luminaire comprising a stack of parallel light transmissive transparent plates comprising a light guide plate and an optical plate. The light guide plate comprises a first and a second major light guide surface and a circumferential edge-wall and is edge-lit by LEDs. At least one of the major light guide surfaces is provided with a light outcoupling structure comprising outcoupling elements arranged at a first pitch P1. The optical plate comprises a first and a second major optical surface, the first major optical surface facing towards the second major light guide surface and only one of the first and second major optical surfaces being provided with an optical structure comprising optical elements arranged at a second pitch P2. The second major light guide surface and the first major optical surface are spaced apart in a direction perpendicular to the major light guide surface by a spacing S, with S being in the range of 0-12 mm. P1 and P2 are in the range of 1-7 mm and a ratio between P1 and P2 is in the range of 0.5-2.

15 Claims, 9 Drawing Sheets

(56) References Cited

U.S. PATENT DOCUMENTS

| | | | |
|---|---|---|---|
| 2012/0314449 A1 | 12/2012 | McCollum et al. | |
| 2015/0029745 A1* | 1/2015 | Asano | G02B 6/005 |
| | | | 362/625 |
| 2017/0131455 A1* | 5/2017 | Asano | G02B 6/0038 |
| 2017/0329066 A1* | 11/2017 | Harada | G02B 5/0294 |
| 2018/0292598 A1 | 10/2018 | Ke et al. | |
| 2019/0004237 A1* | 1/2019 | Kitano | B32B 27/20 |
| 2019/0108786 A1* | 4/2019 | Lee | G02B 5/0278 |
| 2019/0170927 A1* | 6/2019 | Li | G02B 6/0068 |
| 2019/0361166 A1* | 11/2019 | Diana | G02B 6/0055 |
| 2020/0124784 A1* | 4/2020 | Namikawa | G02B 6/0088 |
| 2022/0137285 A1* | 5/2022 | Kim | G02B 6/0055 |
| | | | 362/612 |

* cited by examiner

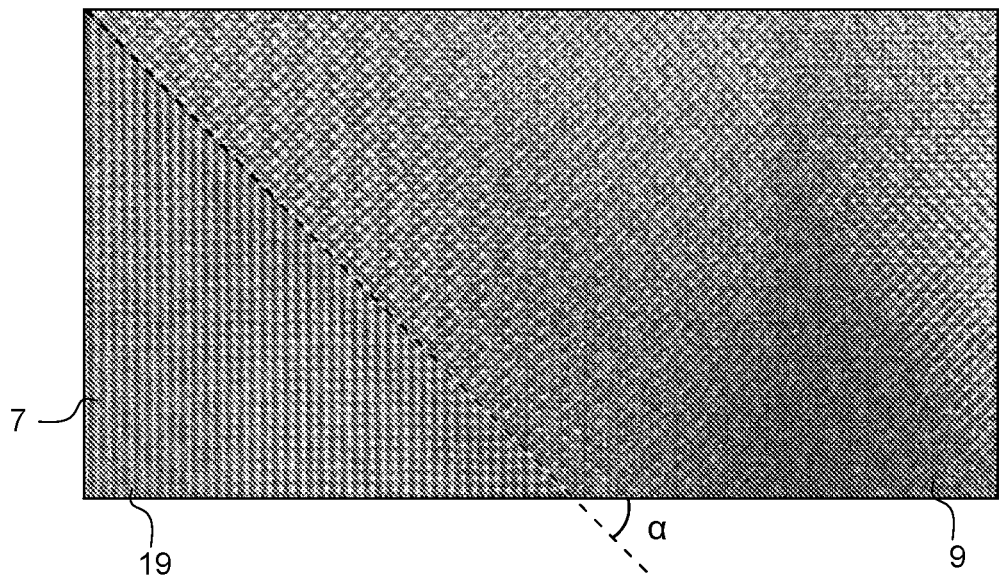
FIG. 3E
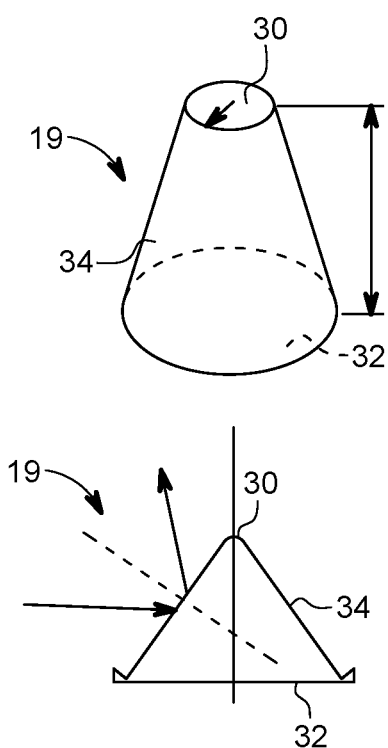 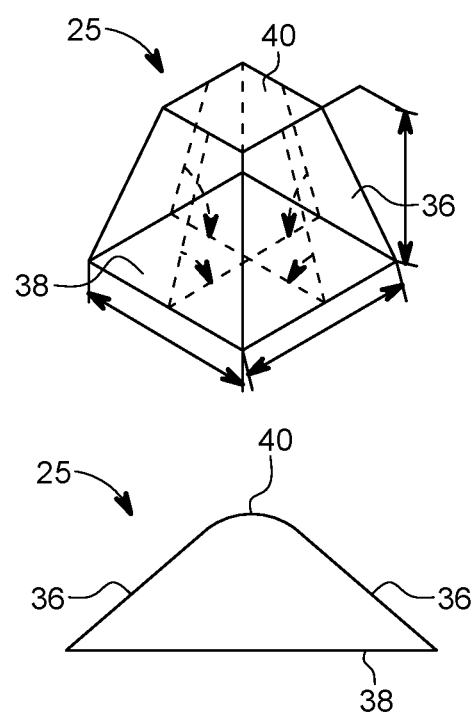
FIG. 4A                FIG. 4B

LUMINAIRE AND LIGHTING SYSTEM

CROSS-REFERENCE TO PRIOR APPLICATIONS

This application is the U.S. National Phase application under 35 U.S.C. §371 of International Application No. PCT/EP2021/062045, filed on MAY 6, 2021, which claims the benefit of European Patent Application No. 20176584.9, filed on MAY 26, 2020, and European Patent Application No. 20174719.3, filed on May 14, 2020. These applications are hereby incorporated by reference herein.

The invention relates to a luminaire and a lighting system comprising a plurality of said luminaires.

BACKGROUND OF THE INVENTION

In offices luminaires are needed which meet office compliance regulations.

Office compliance, for example, indicates features like glare, efficiency, comfort next to other specifications. Typically glare is indicated by a value of Unified Glare Rating (UGR), which for offices typically should be 19 or less, and an L65 value, i.e. the maximum luminance of luminaire parts direct visible at a screen angle of >=65 degrees (with the normal to the ceiling of the office), for more details see European Standard EN12464-1 and CIE117-1995. It is also desirable/required that the luminaire provides a minimum level of illumination with a specified minimum efficiency, which feature is defined by the light output ratio (LOR).

Comfort of lighting, for example in offices, becomes more and more of relevance. Lighting comfort relates to a minimum level of illumination, and to levels of glare and distraction of people by the light emitting parts of luminaires, and which preferably should be as low as possible. Thereto known luminaires providing general, ambient illumination in offices are mounted at the ceiling of the office and are provided with optics and screens to evenly distribute the generated light, to direct generated light into specific directions and to shield people form high luminance parts of the luminaires from direct view within a specific angle range. Typically these optics comprises optical plates provided with optical structure comprising a pattern of optical elements. It appeared that with known luminaires the combination of all the above-mentioned requirements cannot be attained while said luminaire simultaneously provides sufficient comfort lighting. Furthermore, the known luminaires have the disadvantages that their optical plates are relatively expensive, difficult to manufacture and often lead to distraction of people moving along under these luminaires. Hence, there is a desire to make an efficient office luminaire which is cost effective, can meet the regular office compliance regulations and yet provides comfort lighting.

US20100026703 discloses a light emitting assembly comprising a light source configured to illuminate a stack of parallel arranged light guide plate and optical plate.

SUMMARY OF THE INVENTION

It is an object of the invention to provide a luminaire of the type as described in the opening paragraph in which at least one of the disadvantages is counteracted. Thereto the luminaire of the invention comprises:

a stack of parallel light transmissive plates comprising a light guide plate and an optical plate, wherein the light guide plate comprises a first and a second major light guide surface connected by a circumferential edge-wall and, in operation, is edge-lit by LEDs, at least one of the major light guide surfaces is provided with a light outcoupling structure comprising outcoupling elements arranged at a substantially constant first pitch P1 in an x-direction and P1a in an y-direction perpendicular to the x-direction, the optical plate comprises a first and a second major optical surface, the first major optical surface facing towards the second major light guide surface and only one of the first and second major optical surfaces being provided with an optical structure comprising optical elements arranged at a substantially constant second pitch P2, wherein the second major light guide surface and the first major optical surface are spaced apart in a direction perpendicular to the major light guide surface by a spacing S, with S being in the range of 0-25 mm, preferably 5-9 mm, wherein P1, P1a and P2 are in the range of 1-7 mm, preferably 1.5-6 mm and a ratio of P1 and respectively P1a to P2 is in the range of 0.5-2, preferably 0.8-1.25, i.e. 0.5<=P1/P2, P1a/P2<=2, preferably 0.8<=P1/P2, P1a/P2<=1.25, more preferably P1/P2, P1a/P2 are essentially equal, i.e. P1/P2, P1a/P2=1.

The lightguide is also referred to first optical plate or simply first stage, and the optical plate is also referred to as second optical plate or simply second stage. The first pitch P1 (also referrable to as P1x) relates to both the first pitch in an x-direction P1 (or P1x) and to P1a (also referrable to as P1y) being the first pitch in a y-direction, perpendicular to the x-direction. P1 can be different from P1a or can be equal to P1a. Where in the description the discussion is only at the hand of P1, P1 can be considered to comprise both P1 and P1a.

The inventors found that luminaires having a construction and arrangement of plates and optical elements as specified above, provide an attractive 3D moiré effect. Said moiré effect is obtained because of the stacked arrangement of the light outcoupling structure and the optical structure, i.e. in effect being a superposition of said structures, and because of the mutual arrangement of the outcoupling elements of the outcoupling structure and of the arrangement of the optical elements of the optical structure. By variation in the arrangements, for example by variation of spacing S, and by variation in the pitch ratio P1/P2, the moiré effect can be controlled. As a result, the luminaires can be given an attractive look and at the same time the distracting of people by the luminaire is acceptably low. It is further enabled by the specified construction features that the height of the luminaire (as measured along an axis perpendicular to the second major light guide surface) can be limited to maximal 20 mm, rendering the luminaire even more attractive and in principle suitable for use as a recessed, a surface mounted, or a pendant luminaire. In the context of this invention the expression "substantially constant" means a range of ±10% around a specified value.

It appeared that in particular features like similarity in outcoupling structure of the light guide plate and optical structure of the optical plate determine the attractiveness of the obtained moiré effect. Said similarity typically relates to the arrangements of the respective outcoupling and optical elements and to their respective pitches P1 and P2, which should not mutually deviate too much, i.e. 0.5<=P1/P2<=2. Furthermore it appeared that the spacing between the outcoupling structure and optical structure determines the observed depth and size of the moiré effect. By variation of these features within the given ranges, the effect of the obtained moiré effect can be tuned.

Preferably, the first stage structures (outcoupling elements) are at some distance from each other, if not, the desired moiré effect will eventually disappear. The second stage structures preferably are close to each other for having the best control of glare. With second stage, all the structures are aligned closely to each other for these structures to provide the best moiré effects. Furthermore, if either one of the structures becomes too shallow, the moiré effect will eventually not be visible to the human eye. Typically the spacing S between the second major light guide surface and the first major optical surface is related to the first pitch P1 of the outcoupling elements on the light guide surface, i.e. $0.5*P1<=S<=4*P1$, preferably $1*P1<=S<=2*P1$. Typically the light guide and/or the optical plate are made of transparent material, for example polycarbonate (PC) or polymethylmethacrylate (PMMA), but other transparent materials, for example polyethylene terephthalate (PET), polyethylene (PE), and polypropylene (PP) are also possible.

The luminaire may have the feature that the outcoupling elements and optical elements are arranged in a 2D arrangement according to at least one of an octagonal arrangement (i.e. each element is surrounded by eight neighboring elements, substantially/preferably all located at a same distance), a hexagonal arrangement (i.e. each element is surrounded by six neighboring elements, substantially/preferably all located at a same distance), a square or rectangular arrangement (cubic, i.e. each element has four neighboring elements, preferably all located at a same distance) or a triangular arrangement (i.e. all elements are surrounded by three neighboring elements, preferably all located at a same distance), which are convenient ways for arrangement of the outcoupling and optical elements. Combinations of these arrangement are possible, for example a combination of a hexagonal and a trigonal arrangement and a combination of an octagonal and a square arrangement. These arrangements are preferred because they provide an improved 3D effect with respect to attractiveness, and because they can be arranged to form a closed, tessellated surface. Furthermore, a transparent plate provided with such an arrangement of outcoupling or optical elements can relatively easily be manufactured via an extrusion and embossing process. On the optical plate the optical elements are preferably sized such that they mutually touch each other and form a closed surface for obtaining a further improved optical beam shaping effect as then no light can propagate through the optical plate without being shaped by an optical element.

The luminaire may have the feature that the arrangement of outcoupling elements and arrangement the optical elements have a mutual rotational position around an axis A perpendicular to the second major light guide surface over an angle $\alpha$ of essentially 30 degrees for hexagonal arrangements, of essentially 45 degrees for square/rectangular arrangements, and of essentially 90 degrees for triangular arrangements of the outcoupling elements and optical elements. It appeared that, in addition to the previous mentioned features, said feature of mutual rotational position of said arrangements determines to a significant extent the attractiveness of the obtained moiré effect.

In particular mutual orientational arrangements according to given angle ranges for the various arrangements, render a highly appreciated 3D moiré effect. The best results for desired moiré effects are obtained when both the optical and the light guide elements are hexagonally arranged, and mutually rotated over and angle $\alpha$ of 30 degrees. Yet, it is also possible that the outcoupling elements and optical elements are arranged in different arrangements, e.g. the outcoupling elements are hexagonally arranged and the optical elements are square arranged, or vice versa. In the context of this invention the expression "essentially" means a range of less than ±5%, such as 2%, around a specified angle.

Expressed as a formula, it can be summarized as follows:
Rotation angle $\alpha$ is $(360°/sides)*0.5$. For various pyramidal shapes then applies the following:
Triangle→sides=3→rotation angle $\alpha$ is $120*0.5=60°$;
Square→sides=4→rotation angle $\alpha$ is $90*0.5=45°$;
Hexagons→sides=6→rotation angle is $60*0.5=30°$;
Hexagons combined with Triangle, for example BWF Diamond, from experiments it appeared that with $\alpha=30°$ rotation a nice 3D effect is obtained in spite of the triangle for which $\alpha=60°$ rotation is needed;
Octagonal→sides=8→rotation angle $\alpha$ is $45° *0.5=22.5°$ but if octagonal elements are used, a tessellated surface is always a combination of octagonal and rectangular/square elements. For rectangular/square an angle $\alpha$ of $45°$ rotation is required but still a nice effect is obtained with $\alpha=22.5°$ rotation. Hence, for further improving the moiré effect, not only the pitch but also arrangement is of relevance. Preferably for best 3D effect without distracting moiré effects the arrangement of both first and second stage needs to have a similar or same arrangement, but this arrangement should be mutually rotated in a way that they are out of phase, i.e. mutually rotated, as indicated above.

The luminaire may have the feature that the outcoupling structure is provided only on the first major light guide surface and the optical structure is provided only on the second major optical surface. The inventors found that luminaires having these specific constructional features are attractive, provide comfort lighting and can fulfill the lighting requirements for offices with respect to UGR, L65 and LOR. The outcoupling elements and optical elements can be indented or protruding. Yet, it appeared that comfort of lighting is even further improved when the optical elements are protruding, and the outcoupling elements are either indented and provided on the first major light guide surface or the outcoupling elements are protruded and provided on the second major light guide surface. Yet, indented outcoupling elements are preferred over protruding outcoupling elements as the manufacture of a light guide plate with indented outcoupling elements is easier and more accurate to make than a light guide plate with protruding outcoupling elements. Alternatively or additionally, the outcoupling structure could comprise outcoupling elements embodied as practically flat elements, i.e. non-protruding, or non-indented elements, for example printed dots or etched dots, on either side or on both sides of the light guide plate.

The luminaire may have the feature that the outcoupling elements and the optical elements have a cone-like shape, preferably are circular cones or 4-or 6-faceted cones. It appeared that then the combined results with respect to parameters as UGR, L65 and LOR are further improved. This positive effect is even further improved if it is combined with the optional feature that the cones of the optical elements have a top angle in the range of 100-120 degrees, preferably 103-110 degrees and the cones of the outcoupling elements have a top angle in the range of 60-140 degrees, preferably 70-90 degrees. It appeared that by variation of the features of the cone-like shape and the top angle that the UGR, L65 and LOR parameters can be varied and controlled. This variation can be attained essentially independent from the obtained moiré effect. The pyramid or cone can also be embodied as a frustrated pyramid or cone, by virtually extending the facets or circumferential wall of the pyramid or cone, also referred to as side wall(s) of the pyramid or cone, a virtual top is formed having a virtual top angle in the range of 60-140 degrees, preferably 70-90 degrees. Preferably, the frustrated pyramid or cone is embodied such that the truncation is slightly rounded, i.e. wherein the rounding has a radius R, for example of about 0.5 mm. This renders the light guide plate with such an outcoupling structure readily manufacturable via extrusion in a relatively cheap manner, i.e. at about 25% of the costs of the well-known MLO plate of Jungbecker of which the manufacture requires hot embossing.

In short the moiré effect obtained by the luminaire is mainly determined by the mutual spacing between the light guide plate and the optical plate, and by the (mutual) arrangement of the outcoupling elements and the optical elements, while the UGR, L65 and LOR obtained by the luminaire are mainly determined by the shapes of both the outcoupling elements and the optical elements.

The luminaire may have the feature that the transparent plates have a rectangular shape with two opposite short edge walls and with two opposite long edge walls as perimeter of the rectangular shape, wherein the LEDs are arranged at at least one long edge wall. In such a construction of the luminaire where the LEDs arranged along the long edge wall, the largest distance for light to travel into the light guide essentially is only over the length of the short edge wall. This enables an easier control of uniform light output of the light issued from the light guide towards the optical plate and thus the uniformity of light output over the whole surface of the optical plate. The control and as a result the obtained uniformity in light output is even further improved when the luminaire has the optional feature that the LEDs are arranged at both long edge walls and wherein the outcoupling elements have a protruding size and/or indented depth that, in a direction transverse to the long edge wall, gradually increases over essentially the whole distance from the long edge wall to a (long) center line of the light guide plate. The increasing size and/or depth of the outcoupling elements with increasing distance from the LEDs improves the uniformity of outcoupling of light from the light guide.

The luminaire may have the feature that a diffuser is provided in between the light guide plate and the optical plate, wherein the degree of diffusion is in the range of 10-30%. As light is coupled out of the light guide primarily only occurs at locations where the outcoupling elements are positioned, the light emitting surface of the luminaire, i.e. the optical plate, might show spottiness which frequently is considered undesirable and which might disturb the desired moiré effect. Said diffuser is provided to reduce the risk of the occurrence of spottiness and distortion of the moiré effect. Both by the degree of diffusing and by distance of the diffuser from the optical plate, both the spottiness and the moiré effect can be tuned, e.g. the closer the diffuser is to the optical plate, the stronger the diffusion effect, hence the less spottiness but also the less the (undisturbed) moiré effect, i.e. the moiré effect will be smoothened.

The luminaire may have the feature that the luminaire comprises a reflector facing and extending parallel to the first major light guide surface, said reflector preferably is a diffuse reflector. Practically always some portion of the light that is coupled out from the light guide plate into the optical plate is reflected back as back reflected light from the optical plate to the light guide plate and crosses the light guide plate because said light is at angles that are outside the TIR angle of the light guide plate. To counteract that this back reflected light is lost said reflector is provided for recycling of said back reflected light. This not only has the advantage that the efficiency of the light output of the luminaire (LOR) is improved, but also that a uniform, relatively low background illumination, which is superimposed on the luminous moiré effect, is obtained. Preferably, the reflector is not in optical contact with the light guide plate as this means (partial) loss of the TIR property of the LG-plate and hence results in less efficiency of the luminaire as then at each reflection of light at the reflective layer some light is lost. This light loss at each reflection does not occur with TIR. However, an optical contact of the reflection layer with the light guide plate is acceptable view of cost-price reduction of the luminaire, but goes at the cost of some loss in LOR.

The luminaire may have the feature that the plates are extruded plates made of transparent material like PMMA, PC, and/or PE. These materials are conventional, suitable materials typically used for light guide plates and optical plates.

The luminaire may have the feature that the light guide plate has a thickness Dl and the LEDs have a light emitting surface with a height HL in a direction normal to the first major light guide plate surface, wherein $0.3 \leq Hl/Dl \leq 0.7$. This feature results in efficient light incoupling into the light guide plate, as it counteracts that a relatively large portion of light issued by the LEDs is not directed towards the circumferential wall of the light guide plate, i.e. only little/no light missing at incoupling of light from the LEDs via the edge of the light guide into the light guide, that and incoupling of light occurs at a desired angle range with the major surfaces of the light guide for TIR in the light guide. The luminaire may have the feature that the outcoupling elements have a depth or height Doe in a range of 10-70% of the thickness Dl of the light guide plate. DH might be constant over the whole light guide or it may gradually increase in a direction from the long edge wall to the (long) centerline of the light guide plate. By the depth (or height) being at least 10% it is attained that sufficient light that propagates inside the light guide is impinging on the outcoupling elements, while the upper limit of 70% results in that sufficient light propagates to and is outcoupled by outcoupling elements most remote from the light sources (LEDs).

The luminaire may have the feature that an area of the first major light guide plate surface along the edge wall of the light guide plate, along which the LEDs are arranged, is free from outcoupling elements, said area ranges from L1 to L2, wherein:

$$L_1 = \frac{D}{\sqrt{(n^2 - 1)}} L_2 = \frac{D_l}{\sqrt{(n^2 - 1)}}$$

with
D=the distance between the first major light guide plate surface and the LEDs in a direction normal to the first major light guide plate surface;
Dl=the thickness of the light guide plate in a direction normal to the first major light guide surface; and
n=the index of refraction of the material of the light guide plate.

In offices, luminaires are preferred which meet office compliance regulations like maximal UGR and maximal L65 for a certain area and emitted lumens. Office compliance indicates low glare, high comfort and various other specs to make it complete. The goal is to make a new efficient office luminaire which is cost effective, can meet the regular office compliance regulations and if possible, exceed some. Additionally, the luminaire should look good and height is preferred to be limited till 20 mm by which it can be used for recessed, surface mounted and pending luminaires. It appeared that for some locations of outcoupling elements on the first major light guide plate surface bright spots occur that are detrimental to fulfilling the UGR and L65 office compliance regulations. Said bright spots depends on the presence of optical outcoupling elements in a critical area which appeared to be between L1 and L2 indicating distances from the entry face of the light guide. Before L1, the light from the LED light source, positioned at the edge wall (or entry face of the light guide) cannot reach the outcoupling element due to refraction. Beyond L2 a virtual image of the LED light source can no longer be formed, thus avoiding bright spots. Yet, if the first reachable outcoupling element is too far beyond L2, then dark gaps occur. Hence, the best position of the first reachable outcoupling element is at the L2 location. This feature alone can be considered a separate invention as such.

The invention further relates to a lighting system comprising at least two luminaires according to the invention and as described above, wherein the luminaires are mutually aligned and/or form a closed tessellated surface, wall and/or ceiling. The alignment of the luminaires and/or the closed tessellated surface formed by the plurality of luminaires provides an appealing, coherent, immersing 3D effect.

In short the invention is about obtaining an attractive moiré pattern via optical coupling of the outcoupling structure of the light guide with optical elements of the optical plate and yet fulfilling the Unified Glare Rating (UGR), which for offices typically should be 19 or less, the L65 value, i.e. the maximum luminance of luminaire parts direct visible at a screen angle of $>=65$ degrees (with the normal to the ceiling of the office), and yet with the luminaire providing a minimum level of illumination with a specified minimum efficiency, which feature is defined by the light output ratio (LOR). Thereto the following parameters typically are used for obtaining the desired moiré effect: Variation in mutual orientation of outcoupling structure and optical structure;

Variation in shape and size of outcoupling elements and optical element, i.e. cone, pyramid, inverted top, rounded top, sharp top etc . . . ;

Variation in indented or protruding shape, i.e. the optical elements being indented or protruding and the outcoupling elements being indented;

Variation in arrangement of outcoupling elements and optical elements, i.e. hexagonal, triangular, square etc . . . ;

Variation in pitch between outcoupling elements and optical elements and variation in pitch of outcoupling elements in a single outcoupling structure.

BRIEF DESCRIPTION OF THE DRAWINGS

For a better understanding of the invention, and to show more clearly how it may be carried into effect, reference will now be made, by way of example only, to the accompanying drawings, in which:

FIG. 3A-E show various moiré effects obtained by various combinations of outcoupling structures and optical elements;

FIG. 4A-B shows details of an example of an outcoupling element respectively of an optical element;

DETAILED DESCRIPTION OF PREFERRED EMBODIMENTS

Figure 1A:
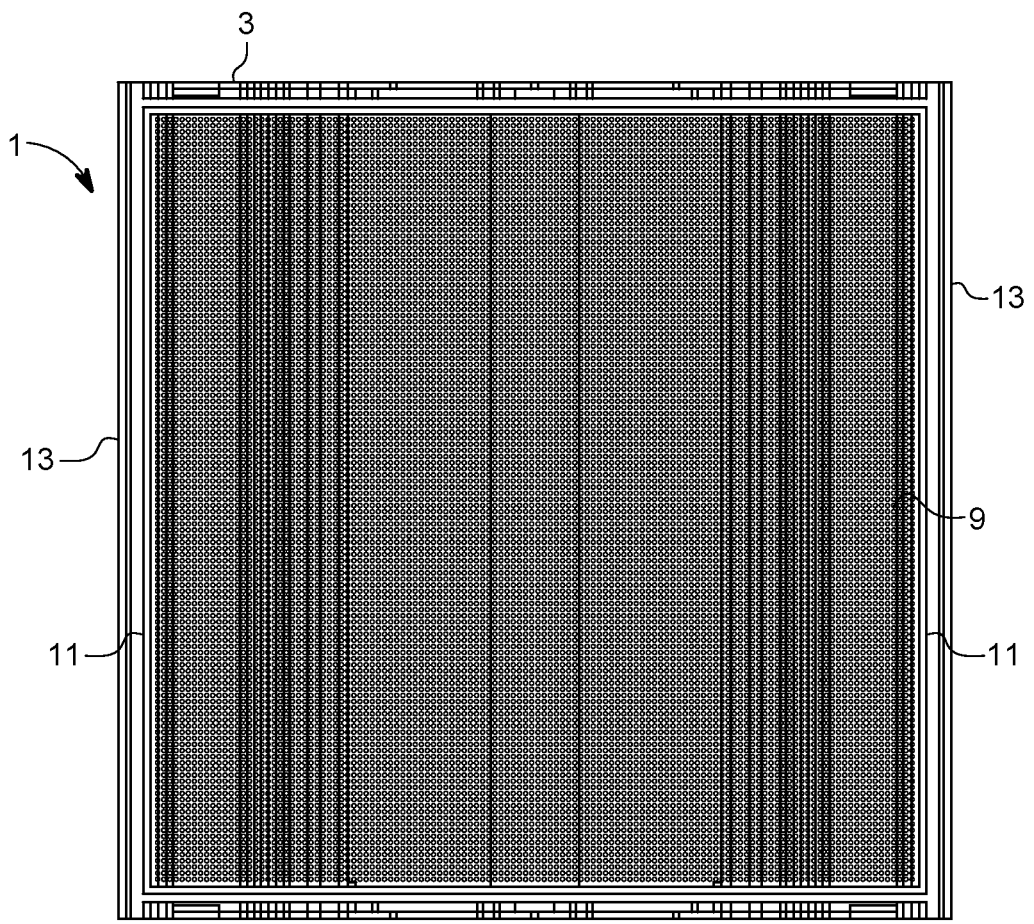
FIG. 1A-D respectively show a bottom view of luminaire (with LEDs at both long sides) (FIG. 1A), a partial perspective cross section of a first embodiment of a luminaire construction according to the invention (FIG. 1B), a partial cross sections of two further embodiments of a luminaire according to the invention (FIGS. 1C+1D)

The invention will be described with reference to the Figures. It should be understood that the detailed description and specific examples, while indicating exemplary embodiments of the apparatus, systems, and methods, are intended for purposes of illustration only and are not intended to limit the scope of the invention. These and other features, aspects, and advantages of the apparatus, systems and methods of the present disclosure will become better understood from the following description, appended claims, and accompanying drawings. It should be understood that the figures are merely schematic and are not necessarily drawn to scale, sometimes dimensions may be exaggerated for the sake of explanation. It should also be understood that the same reference numerals are used throughout the Figures to indicate the same or similar parts.

Figure 1B:
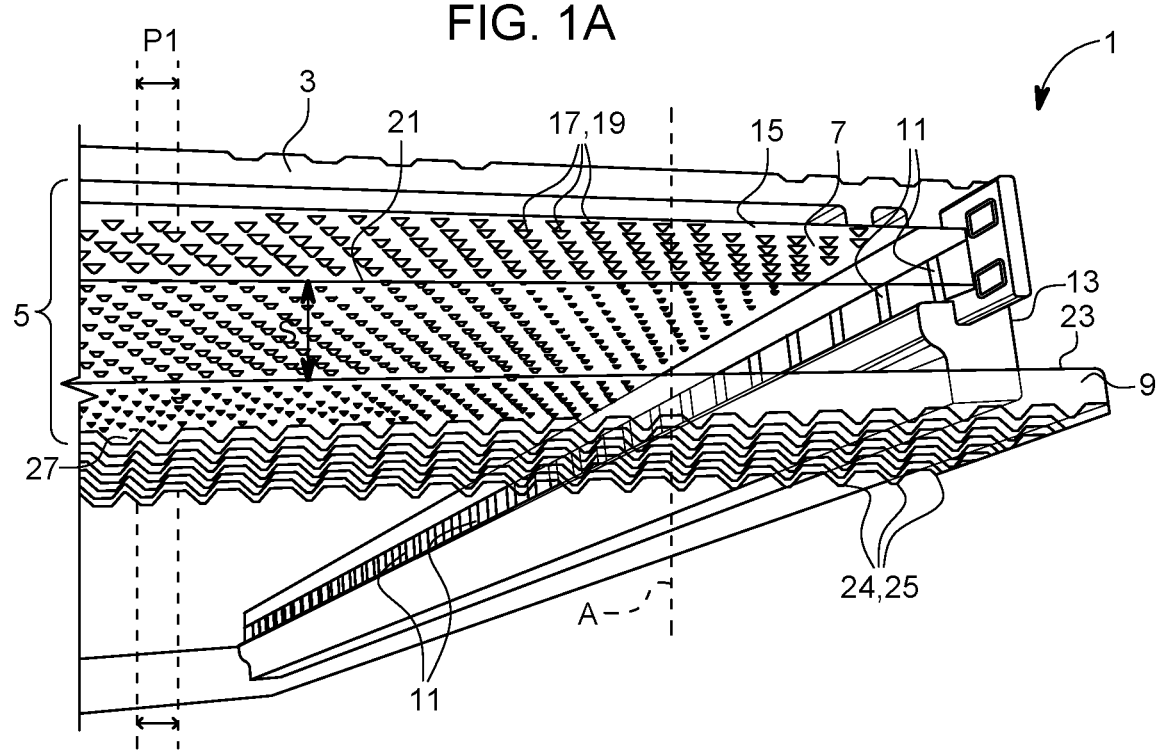

FIG. 1A and FIG. 1B respectively show a bottom view and a partial perspective view of the principal construction a luminaire 1 according to the invention. The luminaire comprises a square housing 3 accommodating a stack 5 of parallel light transmissive transparent plates comprising a light guide plate 7 and an optical plate 9, as particularly visible in the partial cross-section of the luminaire as shown in FIG. 1B. The light guide plate 7 is edge-lit by two arrays of LEDs 11 mounted on opposite side walls 13 of the housing. The light guide plate 7 is provided on a first major light guide surface 15 with an outcoupling structure 17 comprising a grid of indented, conical outcoupling elements 19 at a regular pitch P1. During operation of the LEDs 11, light generated by the LEDs 11 is coupled into the light guide plate 7, redirected by the light outcoupling elements 19 towards the optical plate 9. Said redirected light propagates via a second major light guide surface 21 of the light guide plate 7 and via a first major optical surface 23 into the optical plate 9. Finally said light is shaped by an optical structure 24 of optical elements 25 provided on a second major optical plate surface 27 of the optical plate 9 before being issued to the exterior. The optical elements 25 being protruding square pyramids which are arranged in a grid at a regular pitch P2 on the second major optical plate surface 27. Here, the pitch P1 and pitch P2 are about the same, i.e. about 4 mm. The second major light guide surface 21 and the first major optical surface 23 are spaced apart in a direction perpendicular to the second major light guide 21 surface by a spacing S, with S being about 5 mm. As shown, the grid of the outcoupling elements 19 and the grid of the optical elements 25 are mutually rotated over an angle of 45° about an axis A perpendicular to the major surfaces of the light guide plate 7 and the optical plate 9.

Figure 1C:
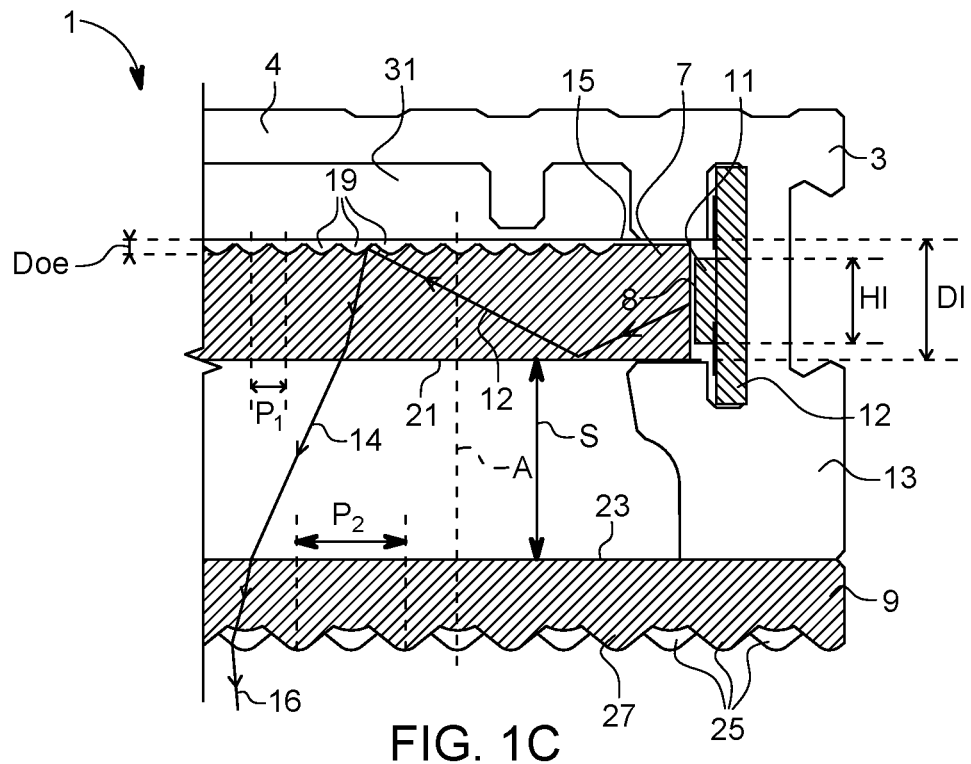

FIG. 1C shows a partial cross section of a first, basic embodiment of a luminaire 1 according to the invention. The luminaire 1 comprises a housing 3 with a back side 4 and a side wall 13 onto which an array of LEDs 11 arranged on a PCB 12 is mounted in a side-lit configuration with an edge 8 of light guide plate 7. The LEDs 11 are configured to issue LED light 12 into the light guide plate 7 during operation. The light guide plate 7 has a first major light guide surface 15 facing towards the back side 4 of the housing 3 creating a space 31, said first major light guide surface 15 being provided with a grid of light outcoupling elements 19 arranged at a regular pitch P1. In the FIG. 1C the outcoupling elements 19 are embodied as indented square pyramids. A second major light guide surface 21 faces a first major optical plate surface 23 of optical plate 9 mutually spaced by a spacing S. Rays of LED light 12 are guided inside the light guide plate 7 via total internal reflection until it hits a light outcoupling element 19 by which it is redirected as redirected light 14 to the optical plate 9. The optical plate 9 comprises a grid of optical elements 25 arranged at a regular pitch P2 on a second major optical plate surface 27 which shape and issue the redirected light 14 as shaped light 16 to the exterior. The grid of outcoupling elements 19 and grid of optical elements 25 are mutually rotated over an angle of 45° about an axis A perpendicular to the light guide plate 7 and the optical plate 9. By varying the shape of the outcoupling elements 19 and the optical elements 25, the pitches P1 and P2, the mutual arrangement of the grids of light guide elements 19 and optical elements 25 and varying the spacing S, differences in characteristics of the shaped light as issued by the luminaire 1 to the exterior can be attained. As further shown, the light guide plate has a thickness Dl and the LEDs have a light emitting surface with a height Hl in a direction normal to the first major surface of the light guide plate, wherein Hl/Dl=≈0.6. Furthermore, the outcoupling elements have a depth Doe, with Doe/Dl≈0.15.

Figure 1D:
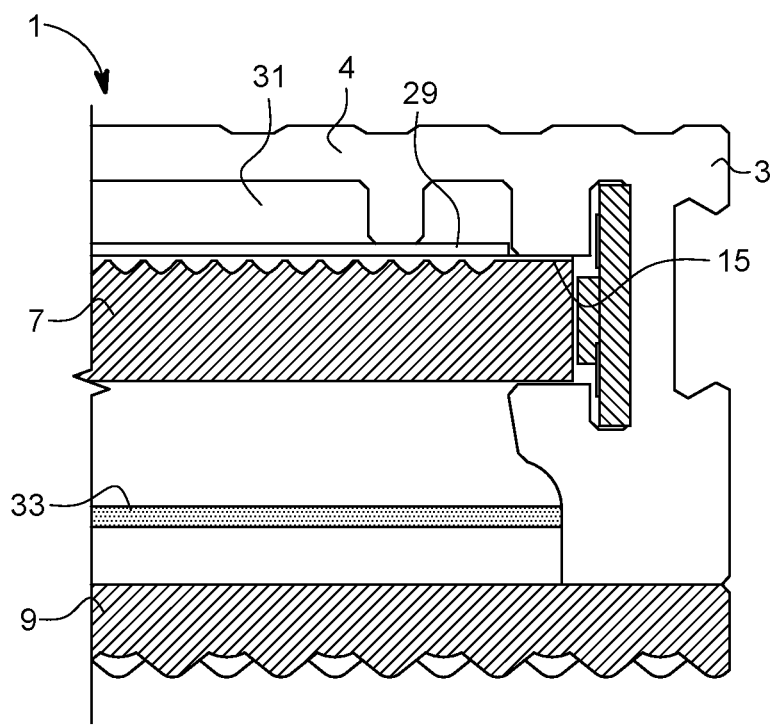

FIG. 1D shows a partial cross section of a second embodiment of a luminaire 1 according to the invention similar to the luminaire as shown in in FIG. 1C. Yet in this second embodiment a reflector 29 is provided in a space 31 between the back side 4 of the housing 3 and the first major light guide surface 15 to reduce light losses by recycling of light that unintentionally is issued from the light guide plate 7 towards the back side 4 of the housing 3. Furthermore, a diffuser 33 is provided in between the light guide plate 7 and the optical plate 9 to render the luminaire 1 to issue light to the exterior in a more uniform manner.

Figure 2A:
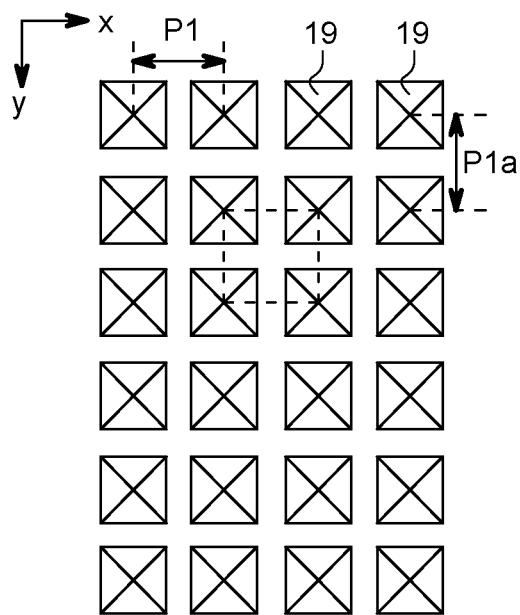
FIG. 2A-D shows various arrangements of optical and/or outcoupling structures.
Figure 2B:
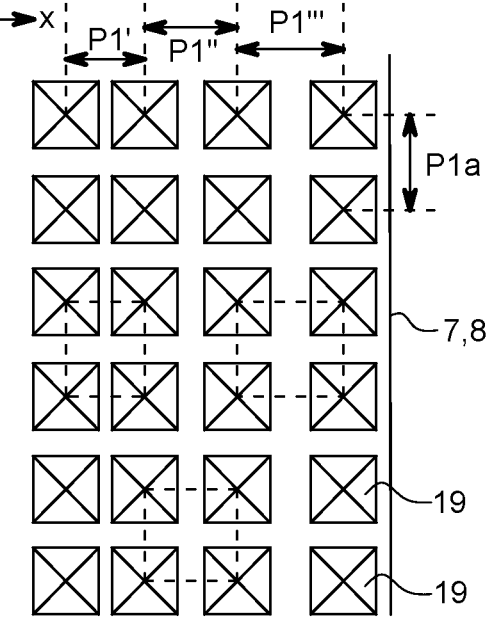
Figure 2C:
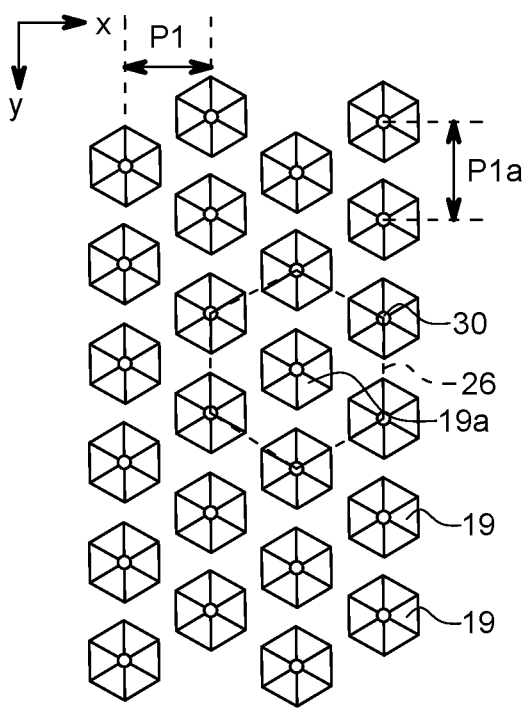
Figure 2D:
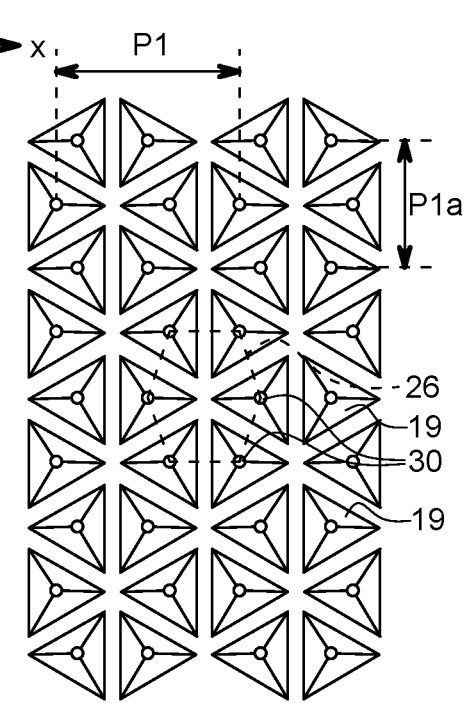

FIG. 2A-D shows various arrangements of optical and/or outcoupling structures. The arrangements of the elements in the structures are discussed at the hand of outcoupling structures, but equally applies to optical structures. In FIG. 2A the outcoupling elements 19 are embodied as square pyramids and arranged in a square grid with a regular pitch P1 and P1a respectively in x- and y-direction that define the first major light guide surface 15, wherein P1=P1a. In FIG. 2B the outcoupling elements 19 are square pyramids with a decreasing pitch P1''', P1'', P1' with increasing distance from the edge 8 of the light guide plate 7 in the x-direction, and with a constant pitch P1a in the y-direction. In FIG. 2C the outcoupling elements 19 are embodied as regular hexagonal, truncated pyramids with constant pitch P1 in the x-direction and a constant pitch P1a, different from a pitch P1, in the y-direction. The outcoupling elements 19 are arranged in a regular hexagonal arrangement, the lines connecting the six truncated tops 30 of six hexagonal outcoupling elements around a central hexagonal outcoupling element 19a form an equilateral hexagon 26. In FIG. 2D the outcoupling elements 19 are embodied as regular trigonal, truncated pyramids with a constant pitch P1 in the x-direction and a constant pitch P1a, different from P1, in the y-direction. The outcoupling elements 19 are arranged in a hexagonal arrangement, the lines connecting the six truncated tops 30 of six, neighboring, trigonal outcoupling elements 19 pointing to each other, form a hexagon 26 stretched in the y-direction.

Figure 3A:
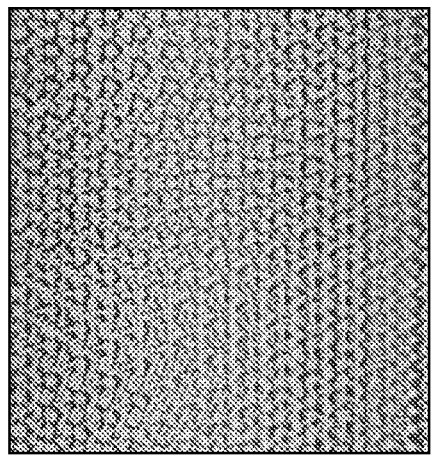

FIG. 3A-E show various moiré effects obtained by various combinations of a light guide plate outcoupling structures and an optical plate with optical elements spaced apart by 2 mm wherein:

FIG. 3A shows a hexagonal grid arrangement on the light guide of regular, indented hexagons of outcoupling elements combined with a hexagonal grid arrangement of regular protruding hexagons and triangles on the optical plate with an aligned arrangement of the grids, i.e. without mutual rotation of the grids, i.e. mutual rotation angle α of the grids is 0°. The moiré effect obtained by this configuration is experienced as too strong. In a combined grid of hexagons and triangles, the hexagons are touching each other not with the sides but with their points, the triangular spaces thus formed are shaped as triangular pyramids, this optical arrangement is known on a foil material with the trade name BWF Diamond.

Figure 3B:
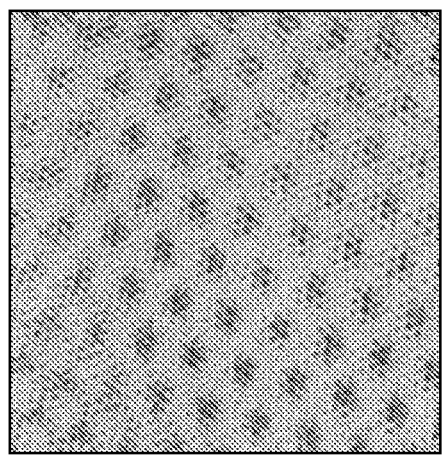

FIG. 3B shows a hexagonal grid arrangement on the light guide of regular, indented hexagons of outcoupling elements combined with a hexagonal grid arrangement of regular protruding hexagons and triangles on the optical plate with a mutual rotational arrangement of the grids, i.e. with a mutual rotation angle α of the grids of essentially 30°. The moiré effect obtained by this configuration is experienced as very attractive.

Figure 3C:
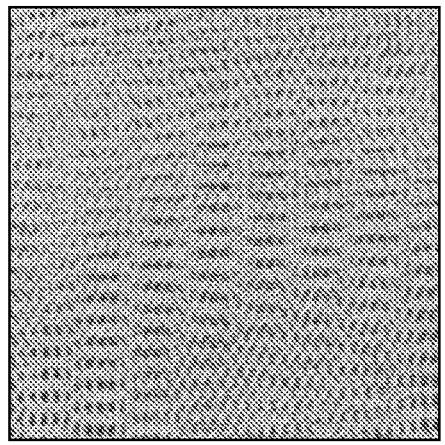

FIG. 3C shows a hexagonal arrangement of protruding hexagonal pyramids of a grid of outcoupling elements on the light guide plate combined with a square arrangement of protruding square pyramids on the optical plate, wherein the grids are aligned, i.e. some sides of the hexagonal pyramids extend parallel to some sides of the square pyramids. The observed moiré effect obtained by this configuration is experienced as reasonable.

Figure 3D:
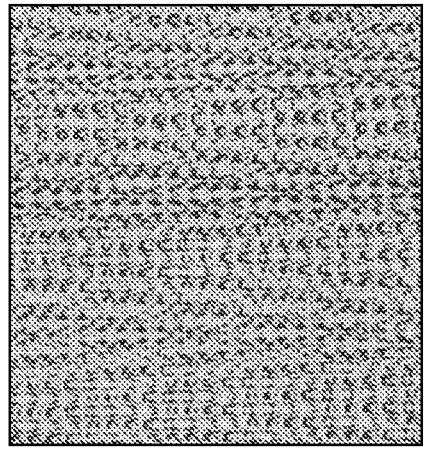

FIG. 3D shows a hexagonal arrangement of protruding hexagonal pyramids of a grid of outcoupling elements on the light guide plate combined with a square arrangement of protruding square pyramids on the optical plate, wherein the grids are mutually rotated by an angle α, none of the sides of the hexagonal pyramids extend parallel to a side of the square pyramids. The observed moiré effect obtained by this configuration is experienced as acceptable.

FIG. 3E shows a partial overlap of a square grid arrangement on the light guide of regular, indented squares of outcoupling elements combined with a square grid arrangement of regular protruding square pyramids on the optical plate with a mutual rotational arrangement of the grids, i.e. with a mutual rotation angle α of the grids of essentially 45°. The moiré effect obtained by this configuration is experienced as very attractive. The part of the light guide plate 7 without overlap with the optical plate 9 clearly shows the square grid arrangement of the square pyramids outcoupling elements 19 on the light guide plate 7.

FIG. 4A shows a detail of an example of an outcoupling element 19 as provided on the first major light guide surface of the light guide (not shown). The outcoupling element 19 is a cone with a smooth annular side face 34. The cone has a height of about 1.0 mm and has a (slightly rounded) top angle of 2*35°. Both the base 32 and the top 30 of the cone are circular shaped each with a respective diameter of about 2.0 mm and 0.7 mm. FIG. 4B shows a detail of an example of an optical element 25. The optical element 25 is a square pyramid having four equally shaped side facets 36. The truncated pyramid is of about 0.4 mm height and has a square base 38 of about 1.4*1.4 mm and a truncated top 40 wherein the truncation is slightly rounded, i.e. here the truncation has a top angle of 2*50° and is rounded, wherein the rounding has a radius R of about 0.5 mm. This renders the light guide plate with such an outcoupling structure readily manufacturable via extrusion in a relatively cheap manner, i.e. at about 25% of the costs of the well-known MLO plate of Jungbecker of which the manufacture requires hot embossing.

Figure 5A:
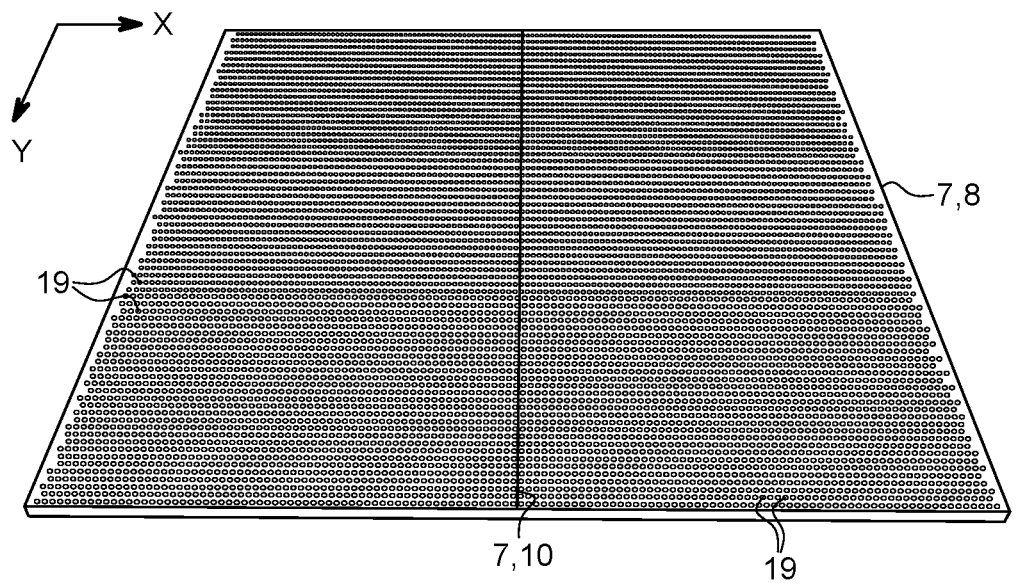
FIG. 5A-B shows a perspective view of a light guide plate with outcoupling structure with details of an example of an arrangement of outcoupling elements.
Figure 5B:
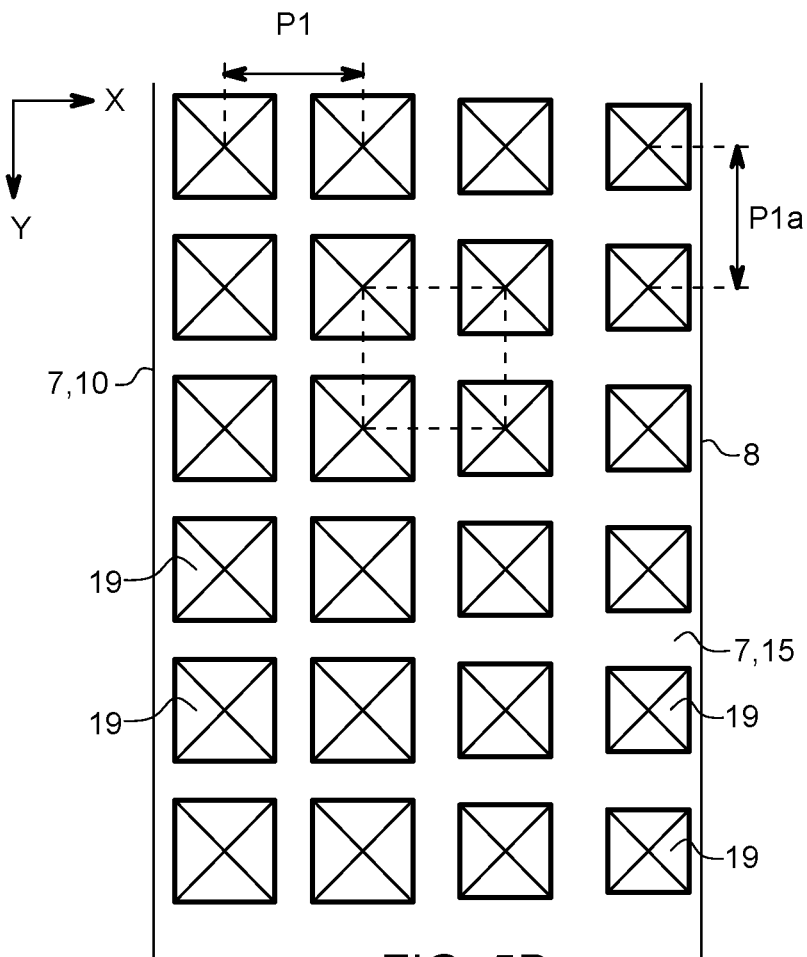

FIG. 5A-B shows a perspective view of a light guide plate with having a gradient in size of outcoupling elements 19. FIG. 5A shows the complete optical light guide plate 7 provided with a square grid of indented square pyramids as outcoupling elements 19 that increase in depth and in size in the direction from the edge 8 of the light guide plate 7 where the LEDs (not shown) are located towards a center line 10 of the light guide plate. The square grid has a constant pitch P1 and P1a both in x- and y-direction that define the first major light guide surface 15, wherein P1=P1a. Alternatively or additionally, the outcoupling elements could be shaped as protruding elements and/or as cones, triangular, hexagonal, octagonal or rectangular pyramids, and/or as flat surface elements such as printed dots, or frosted spots.

FIG. 6A-D shows polar intensity diagrams (or light beam profiles) measured in the x-direction, i.e. 0-180°, and y-direction, i.e. 90-270°, as obtained for some different hexagonal arrangements of outcoupling elements combined with a constant hexagonal arrangement of optical elements. In particular a variation in indented outcoupling structures of the light guide (first stage) is made. In all the FIGS. 6A-D the optical elements are a combined grid of protruding hexagons and triangles, the hexagons are touching each other not with the sides but with their points, the triangular spaces thus formed are shaped as triangular pyramids, this optical arrangement is known on a foil material with the trade name BWF Diamond (and further on referred to as BWF Diamond). In table 1 below the obtained characteristics of beam profiles are given as a function of variation of some parameters in the structure of the outcoupling elements.

TABLE 1

Comparable examples of a hexagonal arrangement of BWF Diamond protruding optical elements combined with various shapes of indented outcoupling elements hexagonally arranged on the first major surface of the light guide plate.

| Figure | optical structure | outcoupling element | top angle | mutual rotation α | LOR | UGR | L65 |
| --- | --- | --- | --- | --- | --- | --- | --- |
| 6A | BWF Diam | cone | 2*35° | 30° | 82% | 18.0 | 2500 |
| 6B | BWF Diam | hex pyramid | 2*35° | 30° | 84% | 17.8 | 2250 |
| 6C | BWF Diam | cone | 2*50° | 30° | 83% | 18.8 | 2650 |
| 6D | BWF Diam | square pyramid | 2*50° | 30° | 87% | 17.8 | 2411 |

Figure 6A:
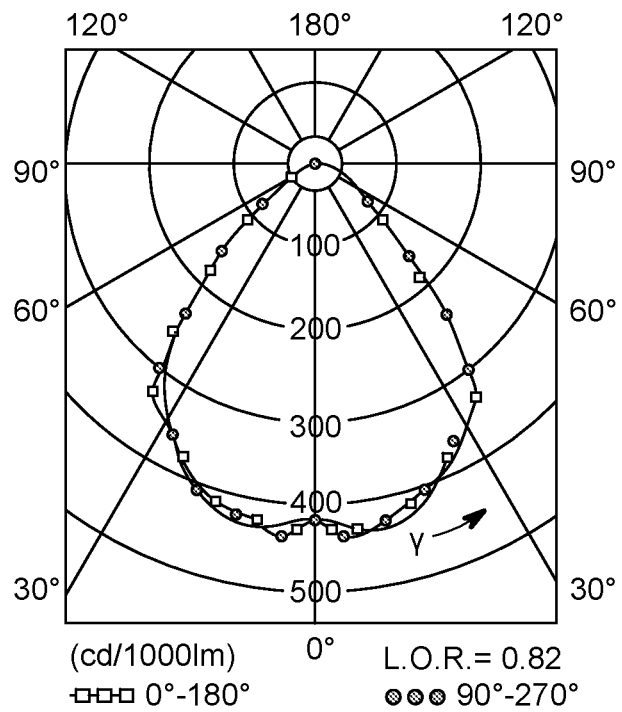
FIG. 6A-D shows light beam profiles as obtained for some different hex-hex combinations of outcoupling structures and optical elements wherein a variation in indented outcoupling structures of the light guide (first stage) is made.
Figure 6B:
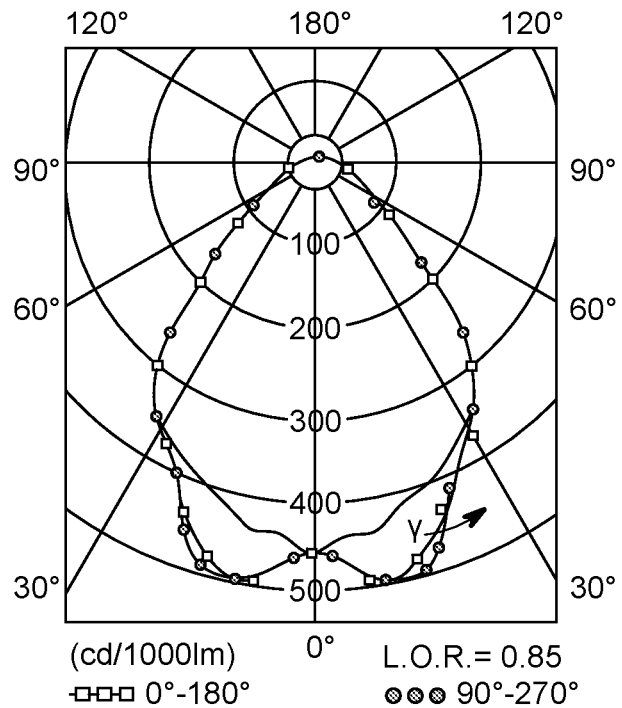
Figure 6C:
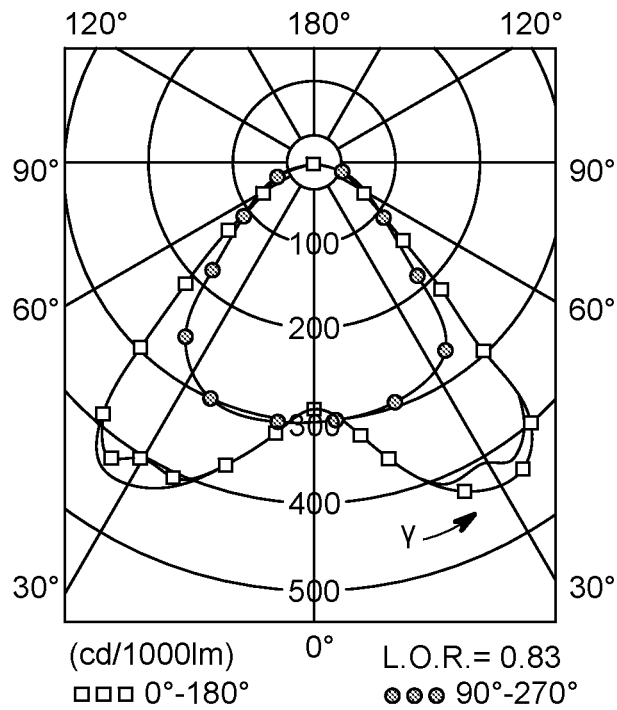
Figure 6D:
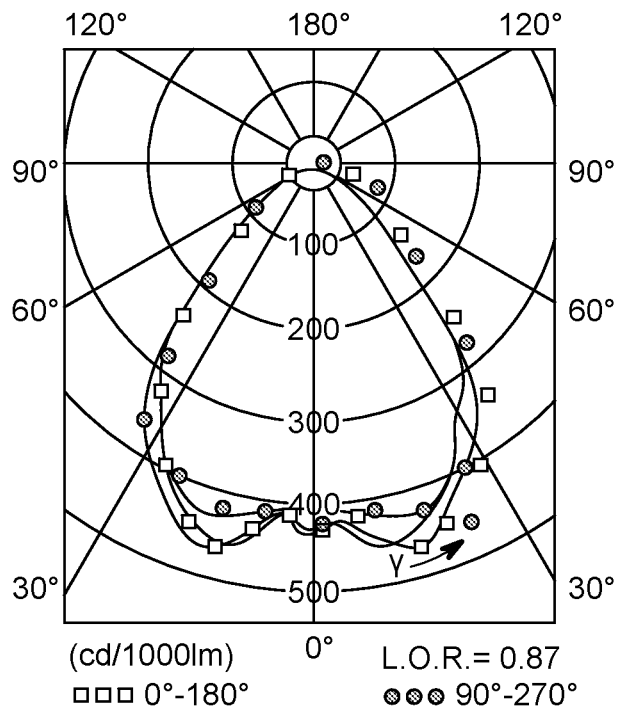

In FIG. 6A the given combination results in the luminaire providing a very symmetric light beam in x- and y-direction. In FIG. 6B the given combination results in the luminaire providing a less symmetric light beam in x- and y-direction but has a high Light Output Ratio (LOR), i.e. the ratio between output power and input power. In FIG. 6C the given combination results in the luminaire providing a batwing beam profile in the x-direction. In FIG. 6D the given combination results in the luminaire providing a symmetric light beam in x- and y-direction combined with a high LOR and a desired low UGR.

Figure 7:
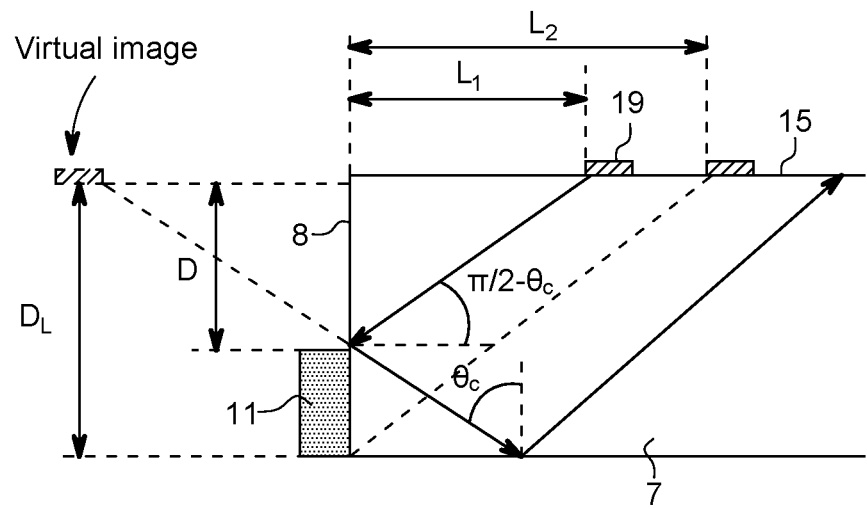
FIG. 7 shows the optimum location for outcoupling elements closest to the edge wall of the light guide plate.

FIG. 7 shows the optimum location for outcoupling elements 19 closest to the edge wall 8 of the light guide plate 7.

$$L_1 = \frac{D}{\sqrt{(n^2-1)}} L_2 = \frac{D_l}{\sqrt{(n^2-1)}}$$

D=the distance between the first major light guide plate surface 15 and the LEDs 11 in a direction normal to the first major light guide plate surface 15;
Dl=the thickness of the light guide plate 7 in a direction normal to the first major light guide surface 15; and
n=the index of refraction of the material of the light guide plate 7.

By avoiding the presence of outcoupling elements in an area defined by L1 to L2 it is avoided that bright spots occur that are detrimental to fulfilling the UGR and L65 office compliance regulations. L1 and L2 indicate distances from the edge wall 8 (i.e. entry face of the light guide plate 7) to the outcoupling element 19 closest to the edge wall 8, in the figure a painted lasered dot. If an outcoupling element 19 is located closer to the edge wall 8 than L1, the light from the LED light source, positioned at the edge wall 8 (entry face) cannot reach the outcoupling element 19 due to refraction, which occurs at critical angle θc. When an outcoupling element 19 is located farther away from the edge wall 8 than L2, a virtual image of the LED light source can no longer be formed, thus avoiding bright spots. Yet, if the first reachable outcoupling element 19 is too far beyond L2, then dark gaps occur. Hence, the best position of the first reachable outcoupling element 19 is at the L2 location. This feature alone can be considered a separate invention as such.

Figure 8:
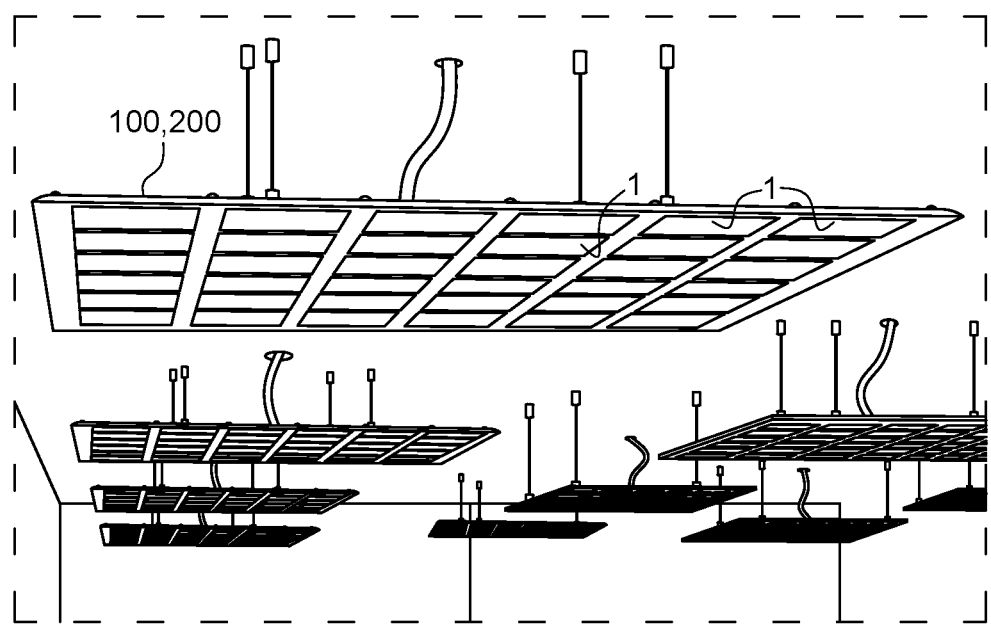
FIG. 8 shows a lighting system comprising an aligned arrangement of luminaires according to the invention.

FIG. 8 shows a lighting system 100 comprising a plurality of luminaires 1 according to the invention aligned in a grid and that together form a suspended false ceiling 200. The luminaires 1 can be individually controlled thus enabling dynamic lighting effects.

The invention claimed is:
1. Luminaire comprising:
a stack of parallel light transmissive plates comprising a light guide plate and an optical plate,
wherein the light guide plate comprises a first and a second major light guide surface connected by an edge-wall along which LEDs are arranged and, in operation, is edge-lit by the LEDs, at least one of the major light guide surfaces is provided with a light outcoupling structure comprising outcoupling elements arranged at a substantially constant first pitch P1 in an x-direction and P1a in an y-direction perpendicular to an x-direction,
the optical plate comprises a first and a second major optical surface, the first major optical surface facing towards the second major light guide surface and only one of the first and second major optical surfaces being provided with an optical structure comprising optical elements arranged at a substantially constant second pitch P2,
wherein the second major light guide surface and the first major optical surface are spaced apart in a direction perpendicular to the major light guide surface by a spacing S, with S being in the range of 0-25 mm, preferably 5-9 mm, wherein P1, P1a and P2 are in the range of 1-7 mm, preferably 1.5-6 mm and ratios P1/P2 and P1a/P2 are in the range of 0.5-2.

2. The luminaire as claimed in claim 1, wherein the outcoupling elements and optical elements are arranged in at least one of an octagonal, a hexagonal, a square, a rectangular, and a triangular arrangement.

3. The luminaire as claimed in claim 2, wherein the outcoupling elements and the optical elements have a mutual rotational position around an axis A perpendicular to the second major light guide surface over an angle a of essentially 30 degrees for hexagonal arrangements, of essentially 45 degrees for square/rectangular arrangements, and of essentially 90 degrees for triangular arrangements of the outcoupling elements and optical elements.

4. The luminaire as claimed in claim 1, wherein the outcoupling structure is provided only on the first major light guide surface and the optical structure is provided only on the second major optical surface.

5. The luminaire as claimed in claim 4, wherein the outcoupling elements are indented and the optical elements are protruding.

6. The luminaire as claimed in claim 1, wherein the outcoupling elements and the optical elements have a cone-like shape.

7. The luminaire as claimed in claim 6, wherein the cones of the optical elements have a top angle in the range of 100-120 degrees and the cones of the outcoupling elements have a top angle in the range of 60-140 degrees.

8. The luminaire as claimed in claim 1, wherein the plates have a rectangular shape with two opposite short edge walls and two opposite long edge walls, and wherein the LEDs are arranged at at least one long edge wall.

9. The luminaire as claimed in claim 8, wherein the LEDs are arranged at both long edge walls and wherein the outcoupling structure has a protruding size and/or an indented depth that, in a direction transverse to the long edge walls, gradually increases over essentially the whole distance from the long edge walls to a long center line of the light guide plate parallel to the long edge.

10. The luminaire as claimed in claim 1, wherein a diffuser is provided in between the light guide plate and the optical plate, wherein a degree of diffusion is in the range of 10-30%.

11. The luminaire as claimed in claim 1 wherein the luminaire comprises a reflector facing and extending parallel to the first major light guide surface.

12. The luminaire as claimed in claim 1, wherein the stack of parallel light transmissive plates are extruded plates are made of a transparent material selected from PolyMethylMethAcrylate, PolyCarbonate, PolyEthylene.

13. The luminaire as claimed in claim 1, wherein in a direction normal to the first major light guide plate surface the light guide plate has a thickness Dl and the LEDs have a light emitting surface with a height Hl, wherein $0.3<=Hl/Dl<=0.7$.

14. The luminaire as claimed in claim 1, wherein an area in between L1 and L2 of the first major light guide plate surface along the edge wall of the light guide plate, along which the LEDs are arranged, is free from outcoupling elements, wherein L1 and L2 are distances from an entry face of the light guide plate, and wherein:

$$L_1 = \frac{D}{\sqrt{(n^2-1)}} \quad L_2 = \frac{D_l}{\sqrt{(n^2-1)}}$$

with
D=the distance between the first major light guide plate surface and the LEDs in a direction normal to the first major light guide plate surface;
Dl=the thickness of the light guide plate in a direction normal to the first major light guide surface; and
n=the index of refraction of the material of the light guide plate.

15. A lighting system comprising at least two luminaires as claimed in claim 1, wherein the luminaires are mutually aligned and/or form a closed tessellated wall/ceiling.

* * * * *